US009251116B2

(12) United States Patent
Muff et al.

(10) Patent No.: US 9,251,116 B2
(45) Date of Patent: Feb. 2, 2016

(54) DIRECT INTERTHREAD COMMUNICATION DATAPORT PACK/UNPACK AND LOAD/SAVE

(75) Inventors: Adam J. Muff, Rochester, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 13/307,609

(22) Filed: Nov. 30, 2011

(65) Prior Publication Data

US 2013/0138918 A1     May 30, 2013

(51) Int. Cl.
*G06F 15/78*     (2006.01)

(52) U.S. Cl.
CPC ........ *G06F 15/7832* (2013.01); *G06F 15/7825* (2013.01)

(58) Field of Classification Search
CPC ................... G06F 2212/1016; G06F 9/30178; G06F 9/3853; G06F 12/04; G06F 12/08; G06F 15/7832; G06F 9/30025
See application file for complete search history.

(56) References Cited

U.S. PATENT DOCUMENTS

| 5,420,981 | A * | 5/1995 | Ivie et al. | 709/227 |
| 6,253,222 | B1 * | 6/2001 | Dyer et al. | 708/203 |
| 2006/0020771 | A1 * | 1/2006 | Kunimatsu et al. | 712/34 |
| 2006/0071825 | A1 * | 4/2006 | Demos | H03M 7/24 |
| | | | | 341/50 |
| 2007/0112566 | A1 * | 5/2007 | Chen | 704/240 |
| 2007/0160305 | A1 * | 7/2007 | Demos | 382/244 |
| 2009/0113088 | A1 * | 4/2009 | Illowsky et al. | 710/62 |
| 2009/0187734 | A1 * | 7/2009 | Mejdrich et al. | 712/22 |
| 2009/0322777 | A1 * | 12/2009 | Lu | G06T 9/00 |
| | | | | 345/582 |
| 2010/0125621 | A1 * | 5/2010 | Oliver et al. | 708/620 |
| 2010/0189111 | A1 * | 7/2010 | Muff et al. | 370/400 |
| 2011/0002396 | A1 * | 1/2011 | Ivanov | 375/240.24 |
| 2011/0249865 | A1 * | 10/2011 | Lee et al. | 382/103 |
| 2013/0106834 | A1 * | 5/2013 | Curington | 345/419 |

OTHER PUBLICATIONS

Patterson and Henessy, "Computer Organization and Design", Morgan Kaufmann Publishers, Inc., 1998, pp. 340.*

* cited by examiner

*Primary Examiner* — Mark Zimmerman
*Assistant Examiner* — Nurun N Flora
(74) *Attorney, Agent, or Firm* — Middleton Reutlinger

(57) ABSTRACT

A circuit arrangement, method, and program product for compressing and decompressing data in a node of a system including a plurality of nodes interconnected via an on-chip network. Compressed data may be received and stored at an input buffer of a node, and in parallel with moving the compressed data to an execution register of the node, decompression logic of the node may decompress the data to generate uncompressed data, such that uncompressed data is stored in the execution register for utilization by an execution unit of the node. Uncompressed data may be output by the execution unit into the execution register, and in parallel with moving the uncompressed data to an output buffer of the node connected to the on-chip network, compression logic may compress the uncompressed data to generate compressed data, such that compressed data is stored at the output buffer.

23 Claims, 11 Drawing Sheets

DIRECT INTERTHREAD COMMUNICATION DATAPORT PACK/UNPACK AND LOAD/SAVE

FIELD OF THE INVENTION

The invention is generally related to data processing in a computing system including a plurality of interconnected processing blocks (i.e., nodes), and in particular to processor architectures and communication architectures incorporated therein.

BACKGROUND OF THE INVENTION

A Network on a Chip (NOC) is a novel integrated circuit that applies a network architecture to a single chip to create a unique processing unit. Rather than utilizing a standard single von Neumann architecture, which has a control unit that coordinates data flowing between an arithmetic logic unit and memory, and between the arithmetic logic unit and input/output buffers along system input/output (I/O) busses, a NOC passes data between a plurality of integrated processor blocks (each of which may utilize a von Neumann-type processor) using packets. Each packet includes a header, which addresses the processor block that is to receive and process the packet, and a payload generally including one or more data words. In order to increase data transmission speeds between processor blocks, the data to be transmitted is generally packed into the packets prior to transmission and unpacked prior to execution at a logic node. In conventional systems data words are packed for transmission by removing spaces between the data words in the packet so that the data packets include "unaligned" data words, and prior to execution, the data words are re-aligned, i.e., the removed spaces are re-inserted in the appropriate locations. However, in conventional systems the packing and unpacking of the packets generally decreases efficiency of the processor blocks.

Therefore, a significant need continues to exist in the art for improving the performance of transferring and processing data packets.

SUMMARY OF THE INVENTION

The invention addresses these and other problems associated with the prior art by providing on-the-fly decompression/compression of the inter-thread data packets when transmitting the data packets between the execution registers and input/output buffers of IP blocks arranged within a network on a chip (NOC) arrangement. In particular, NOC systems consistent with the invention, a plurality of integrated processor blocks may be interconnected via an on-chip network, where each integrated processor block may include an output buffer connected to the on-chip network. In some embodiments, compression of data may be performed on-the-fly in parallel with moving data from an execution register of an integrated processor block to an output buffer of the integrated processor block utilizing compression logic associated with the integrated processor block. Similarly, integrated processing blocks may include input buffers connected to the on-chip network, and decompression of data may be performed on-the-fly in parallel with moving data from an input buffer to an execution register of an integrated processor block utilizing decompression logic associated with the integrated processor block.

In embodiments consistent with the invention, an integrated processor block stores a compressed data packet including compressed data words at an input buffer of the integrated processor block, and in parallel with moving the compressed data packet to an execution register of the integrated processor block, each compressed data word is decompressed utilizing decompression logic to generate an uncompressed data word from each compressed data word. As such, in these embodiments, each compressed data word may be decompressed in parallel with moving the data packet to the execution register of the integrated processor block.

Similarly, in some embodiments consistent with the invention, uncompressed data words are stored in an execution register of the integrated processor block. The uncompressed data words are compressed into compressed data words utilizing compression logic to generate compressed data words in parallel with moving the uncompressed data words from the execution register to an output buffer. A compressed data packet may be generated from the compressed data words stored in the output buffer.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

Figure 1:
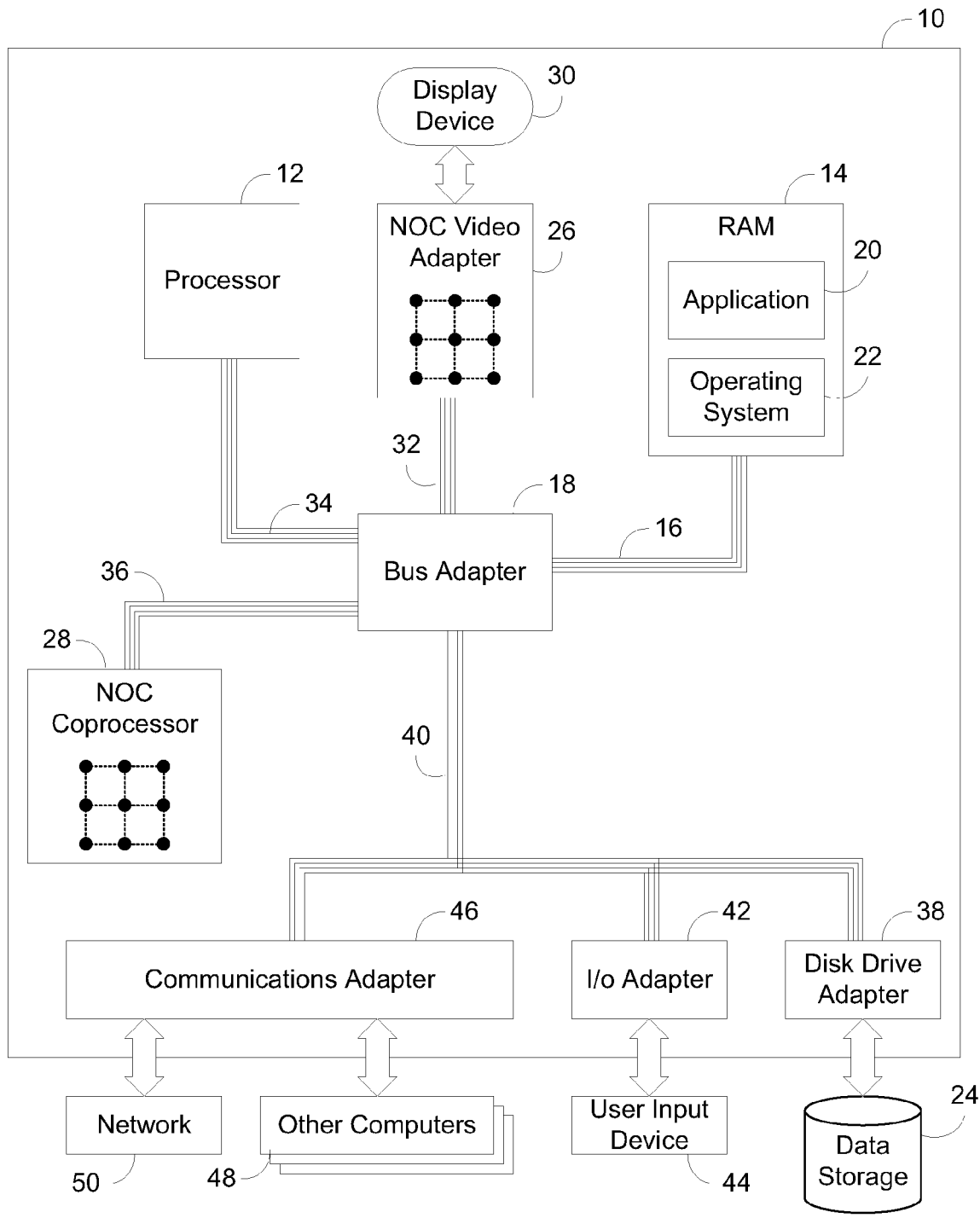
FIG. 1 is a block diagram of exemplary automated computing machinery including an exemplary computer useful in data processing consistent with embodiments of the present invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION OF THE INVENTION

Embodiments of the invention provide a circuit arrangement and method for transferring data within a processing unit that includes a plurality of integrated processor blocks coupled to one another in a network on a chip arrangement. Integrated processor blocks consistent with some embodiments of the invention include compress and/or decompression logic for facilitating compressing and/or decompressing data words in the integrated processor block. In some embodiments, decompression logic of an integrated processor block may be utilized by the integrated processor block such that a compressed data packet including compressed data words is decompressed into uncompressed data words in parallel with moving the data packet from an input buffer of the integrated processor block to an execution register of the integrated processor block. As such, in these embodiments, a data packet received and stored at the input buffer of the integrated processor block may be decompressed in parallel with storing the data words for execution by the integrated processor block.

In some embodiments, compression logic of an integrated processor block may be utilized by the integrated processor block such that uncompressed data words may be compressed into compressed data words in parallel with moving the data packet from an execution register of the integrated processor block to an output buffer of the integrated processor block. As such, in these embodiments, output data from a processor of the integrated processor block stored in the execution buffer (i.e., uncompressed data words) may be compressed into compressed data words concurrent with storing the data words at the output buffer for transfer to another integrated processor block of the processing unit.

Moreover, in some embodiments, an IP block consistent with the invention may include an input buffer coupled to decompression logic and an execution register, such that the decompression logic may decompress data words stored in the input buffer in parallel with moving the data words to the execution register of the integrated processor block. Furthermore, the execution register may be connected to a processor of the integrated processor block, such that data words in the execution register may be executed by the processor. Similarly, in some embodiments, an IP block consistent with the invention may include an output buffer coupled to compression logic and an execution register, such that the compression logic may pack data words stored in the execution register in parallel with the data words being moved to the output buffer.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI')

adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
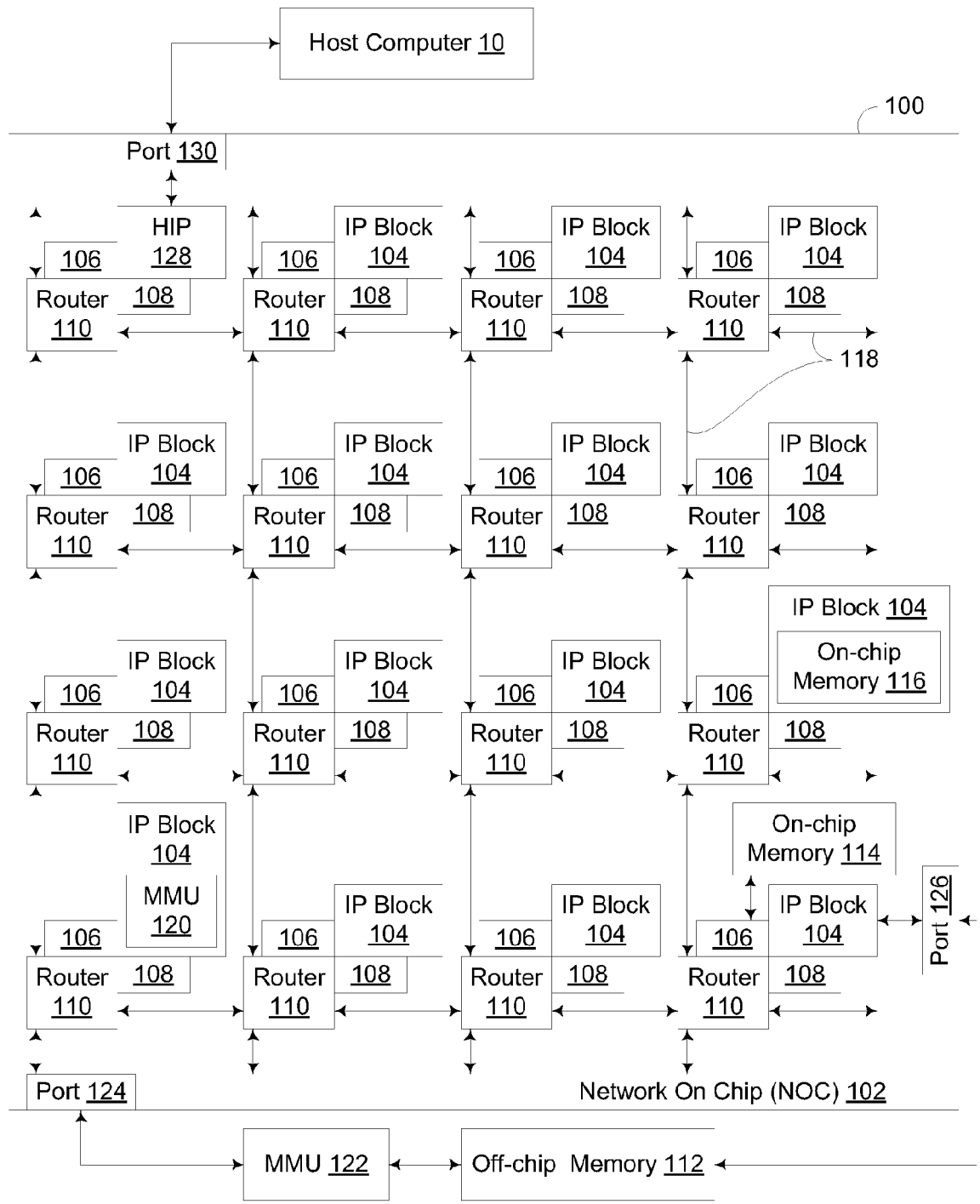
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
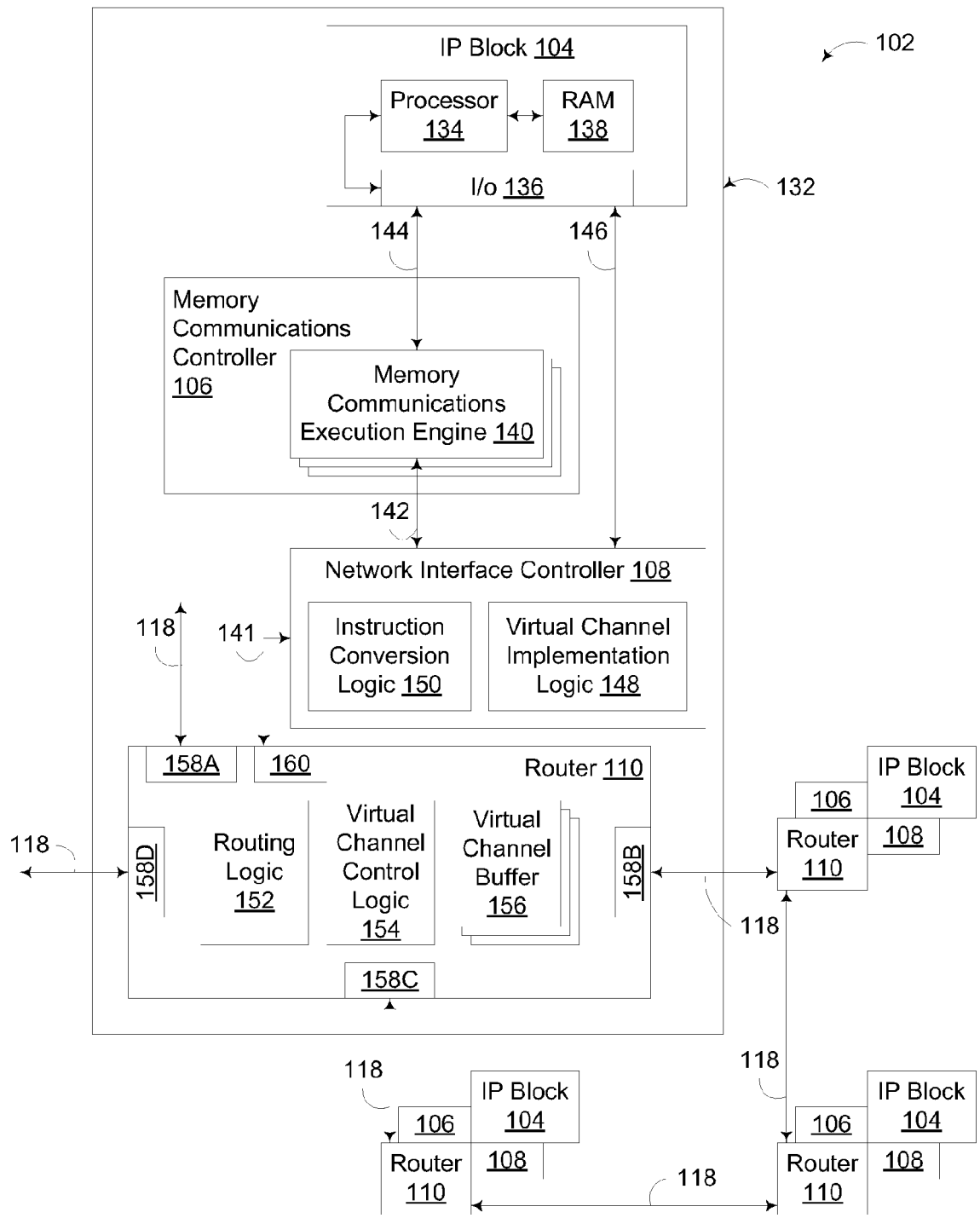
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
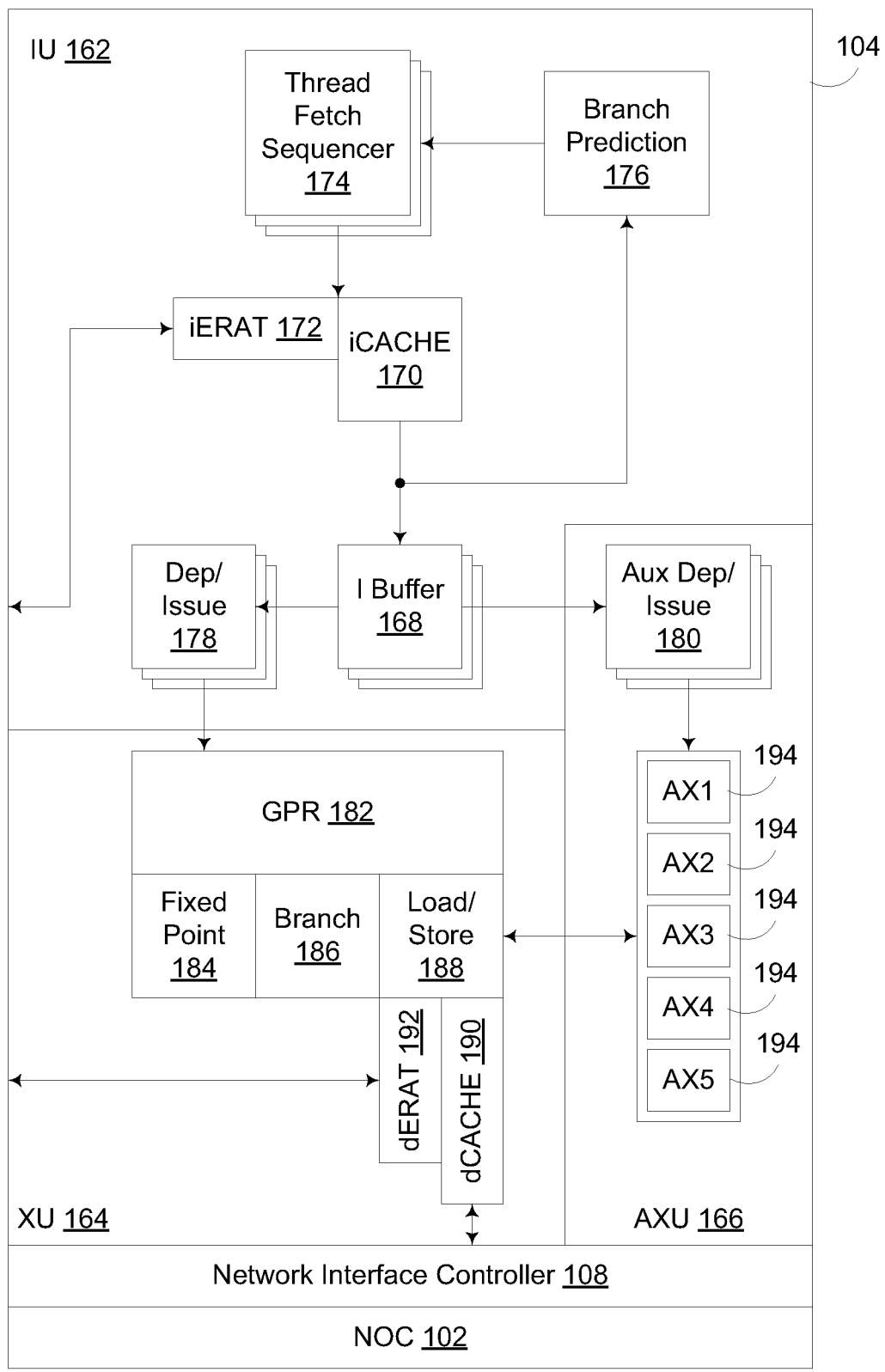
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Direct Inter-Thread Communication Buffer Packet Compression and Decompression in an Integrated Processor Block NOC systems utilizing Direct Inter-Thread Communication (DITC) include input and output buffers for each processing block of the plurality of processing blocks in the NOC. In a NOC, software applications may allocate different nodes within a NOC to different parts of a job, and data associated with the tasks may be communicated to the various nodes utilizing the DITC structure. Additional details regarding NOC systems utilizing Direct Inter-Thread Communication may be found in U.S. Pat. No. 7,837,066 issued to Muff et al., which is incorporated by reference herein in its entirety.

Figure 5:
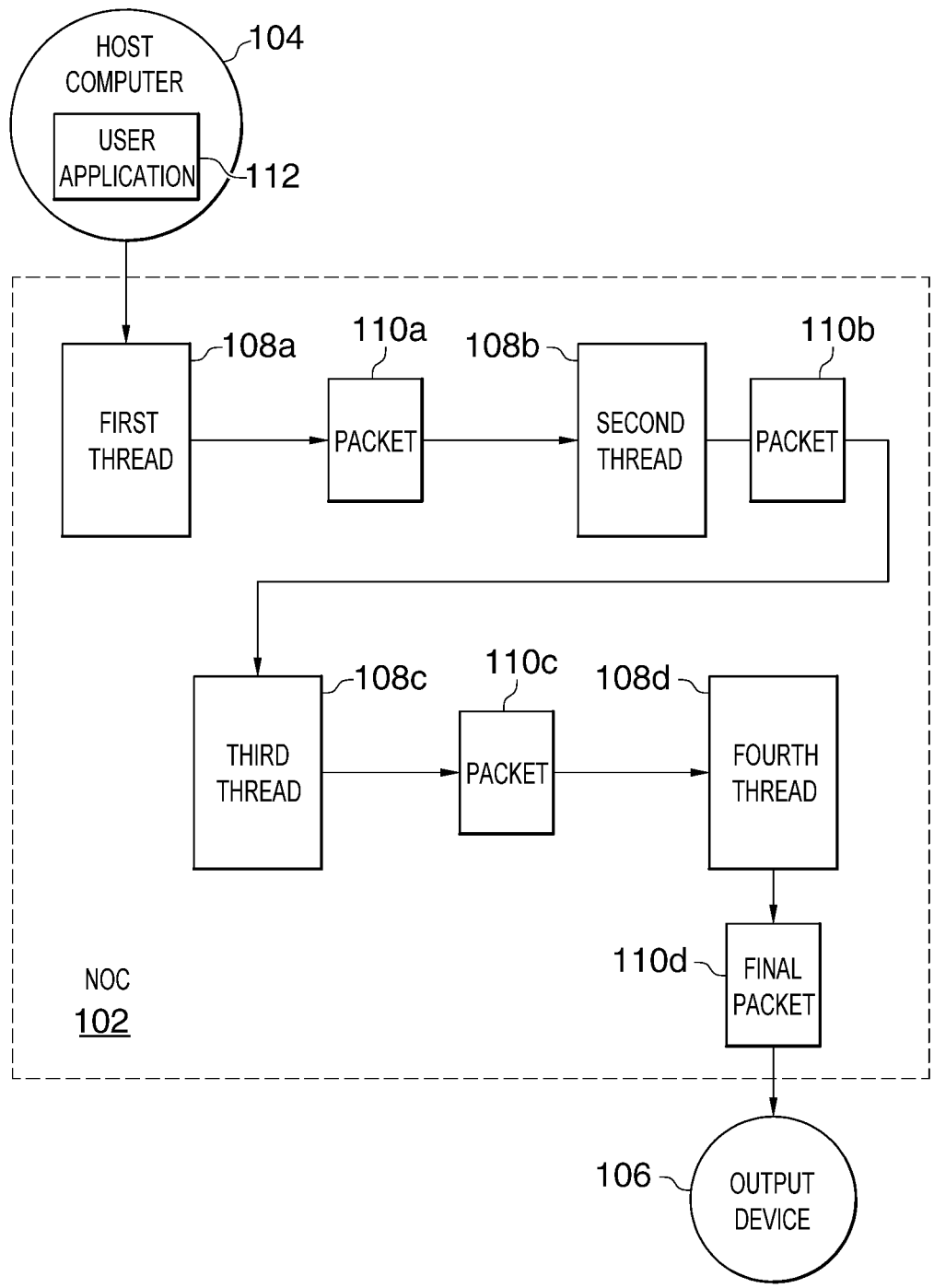
FIG. 5 is a block diagram illustrating an exemplary implementation of an IP block from the NOC of FIG. 2.

Referring to FIG. 5, which illustrates an exemplary NOC 102 consistent with embodiments of the invention, NOC 102 includes a plurality of hardware threads 200a-d, and NOC 102 receives software instructions from a user application 202 in a host computer 204. NOC 102 processes those instructions, and then outputs execution results to an output device 206 (e.g., a monitor, a printer, a storage device, etc.). In an example illustrated in FIG. 5, the hardware threads 200a-d of NOC 102 are assigned to perform a different portion of a job described by user application 202. Thread 200a may handle a first part of the overall job, resulting in an output that is placed into a first packet 208a and sent to the second thread 200b. The second thread may process the data from the first packet 208a and generate an output that is packeted into a second packet 208b and sent to the third thread 200c. The third thread 200c may process the data from the second packet 208b and generate an output that is packeted into a third packet 208c and sent to a fourth thread 200d. The fourth thread 208d may process the third packet 208c and generate a final packet 208d that is sent to the output device 206.

Figure 6:
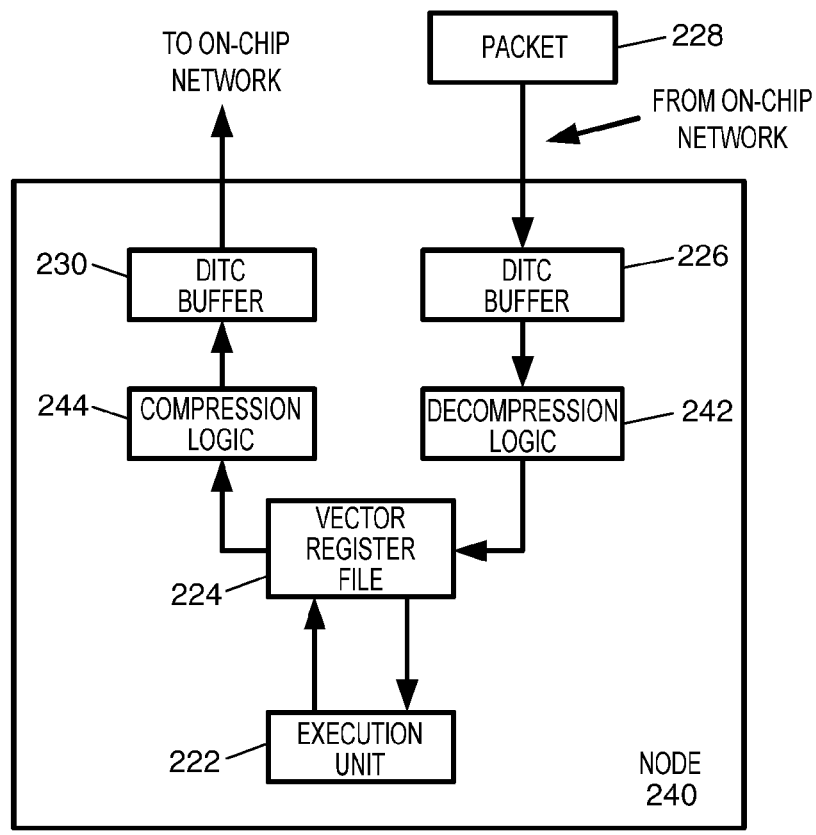
FIG. 6 is a block diagram illustrating an exemplary implementation of an IP block from the NOC of FIG. 2 including compression and decompression logic consistent with some embodiments of the invention.

FIG. 6 illustrates a conventional DITC architecture of a node in some NOC systems. As shown in FIG. 6, a node 220 of an exemplary NOC system includes an execution unit 222 connected to a register 224 such that data words may be loaded from the register 224 to the execution unit 222 for processing and output data may be output from the execution unit 222 to the register 224. Register 224 may also be connected to a DITC input buffer 226, such that data packets, such as data packet 228 may be received from the NOC network into the DITC input buffer 226, and a data packet stored in the DITC input buffer may be loaded into the register 224 for execution by the execution unit 222. In addition, node 220 may include a DITC output buffer 230 connected to the on chip network and the register 224, such that data stored in the register 224 may be moved to the DITC output buffer 230 for transmission to another node of the NOC system over the on-chip network. Moreover, conventional DITC architecture may include unpacking logic (not shown) connected between the DITC input buffer 226 and the register 224 where the unpacking logic may be configured to align data words stored in the DITC input buffer for execution by the execution unit 222. In these conventional systems, the execution unit 222 typically performs the alignment of data words prior to executing instructions utilizing the data words by driving the unpacking logic. Similarly, conventional DITC architecture may include unpacking logic (not shown) connected between the DITC output buffer 230 and the register file 224 where the packing logic may pack data words by removing null spaces between data words before loading the data words into the DITC output buffer 230. In these conventional systems, the execution unit 222 typically performs the removal of null spaces in data words prior to moving the data words to the DITC output buffer 230 by driving the packing logic.

FIG. 6 is a block diagram illustrating a node 240 consistent with embodiments of the invention. The node 240 includes an execution unit 222 connected to a register 224, such that the execution unit 222 may load data words from the register 224 for utilization with execution of one or more instructions by the execution unit 222. In addition the node 240 includes decompression logic 242 connected to the register 224 and a DITC input buffer 226. As described above with respect to FIG. 5, the DITC input buffer 226 may receive a data packet 228 including one or more data words from an on-chip network of a NOC system on which the node 240 is configured. In parallel with moving the data words of the data packet stored in the DITC input buffer 226 to the register 224 for utilization in execution by the execution unit 222, the decompression logic decompresses the data words of the data packet, such that uncompressed data words based on the compressed data words stored in the DITC input buffer are stored in the register 224.

The node 240 further includes compression logic 244 connected to the DITC buffer 230 and the register 224. In parallel with moving the data words (i.e., output data) in the register 224 to the DITC output buffer 230, the compression logic 244 may compress the data words such that compressed data words based on the uncompressed data words stored in the register 224 are stored in the DITC output buffer 230. In embodiments consistent with the invention, compression logic, such as compression logic 244 of node 240, may be configured to compress data words by performing one or more operations on each data word to generate a compressed data word based at least in part on the uncompressed data word. Similarly, in some embodiments consistent with the invention, decompression logic, such as decompression logic 242 of node 240, may be configured to decompress data words by performing one or more operations on each compressed data word to generate an uncompressed data word based at least in part on the compressed data word.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include, for example, non-transitory recordable type media such as volatile and nonvolatile memory devices, floppy and other removable disks, hard disk drives, USB drives, optical disks (e.g. CD-ROM's, DVD's, Blu-Ray discs, etc.), among others.

In addition various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environments illustrated in FIGS. 1-6 are not intended to limit the invention. Indeed, those skilled in the art will recognize that other alternative hardware and/or software environments, and incorporating different numbers and configurations of hardware resources, may be used without departing from the scope of the invention. Those skilled in the art will also recognize that the invention contemplates all types of computing systems, including computing systems and other programmable electronic devices configured with processors, memory and/or storage devices, including, for example, client computers, server computers, portable computers, handheld computers, embedded controllers, etc.

Figure 7:
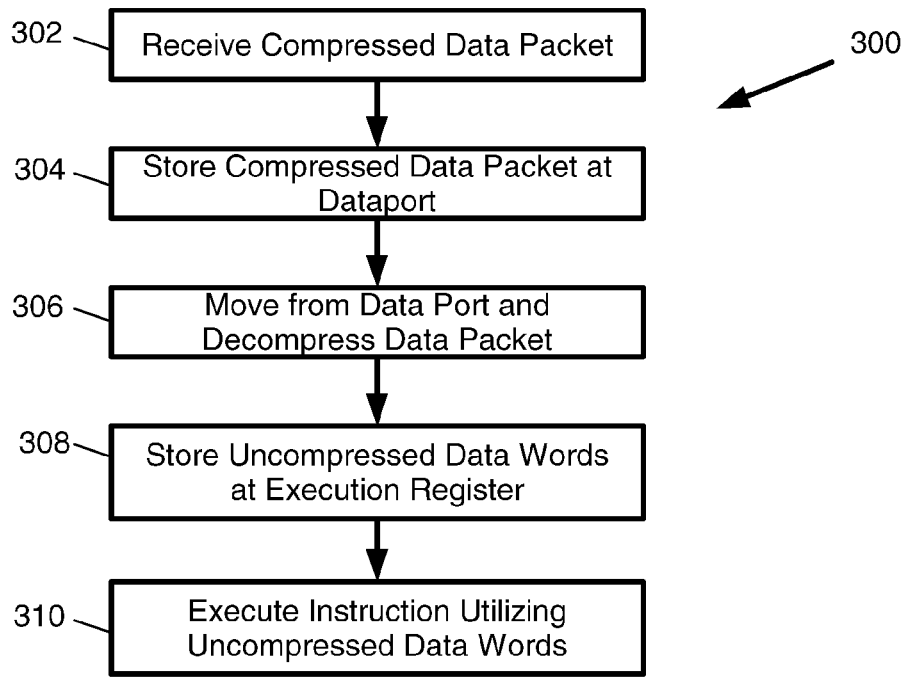
FIG. 7 is a flowchart illustrating a sequence of operations that may be performed by the IP block of FIG. 6 to decompress compressed data in parallel with moving the compressed data to an execution register.

FIG. 7 is a flowchart 300 illustrating a sequence of operations that may be executed by an integrated processor block (i.e., a node) of a NOC system consistent with embodiments of the invention to load a data packet received from an on-chip network of the NOC system for processing by the integrated processor block. The integrated processor block receives a data packet from the on-chip network (block 302), and the data packet is stored in a data port of the integrated processor block (i.e., a DITC input buffer) (block 304). In embodiments of the invention, the data packet stored in the input buffer includes one or more compressed data words. In parallel with moving the data packet from the data port to an execution register of the integrated processor block, the compressed data words may be decompressed by decompression logic of the integrated processor block, such that uncompressed data words are generated by the decompression logic based on the compressed data words of the data packet, and the uncompressed data words are stored in the execution register of the integrated processor block (block 306). As such, in embodiments consistent with the invention, the compressed data words may be decompressed on the fly in parallel with moving the data words to the execution register. An execution unit of the integrated processor block executes one or more instructions which utilize the uncompressed data words (block 310).

Figure 8:
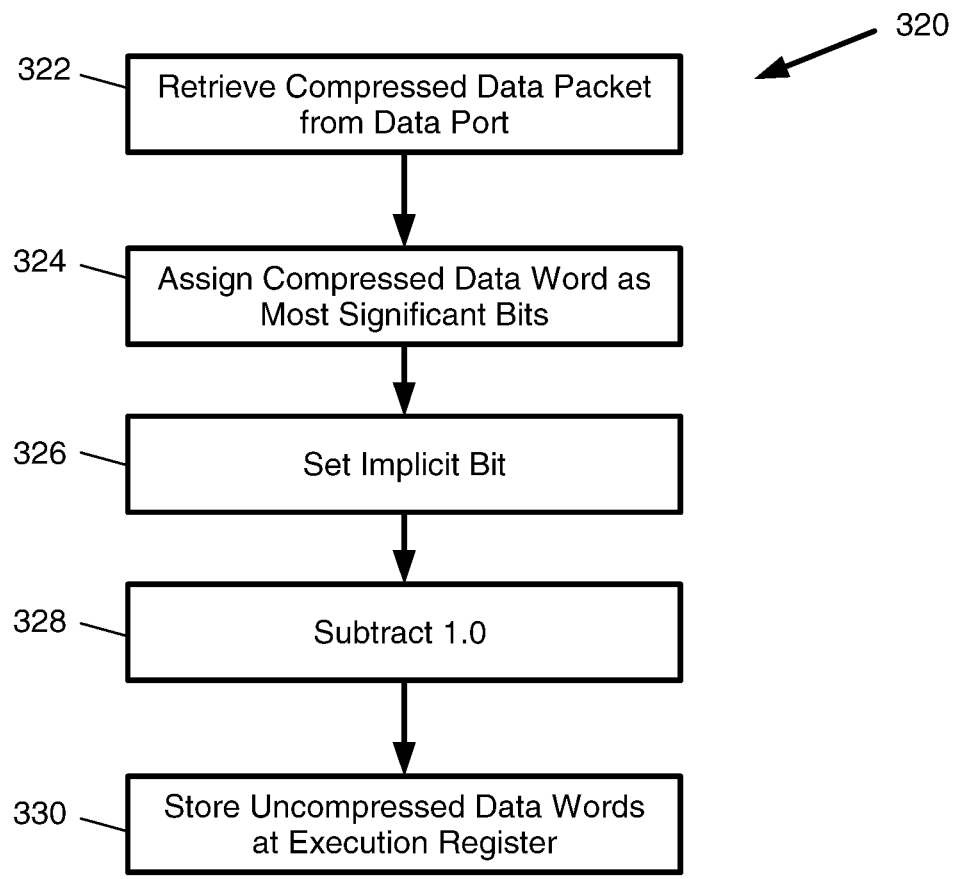
FIG. 8 is a flowchart illustrating a sequence of operations that may be performed by the IP block of FIG. 6 to generate uncompressed data based on compressed data in parallel with moving the uncompressed data to an execution register from a DITC input buffer.

FIG. 8 is a flowchart 320 illustrating a sequence of operations that may be executed by an integrated processor block of a NOC system consistent with embodiments of the invention in parallel with moving compressed data words from a data port (i.e., a DITC input buffer) to an execution register to decompress the compressed data words. A data packet including compressed data words may be retrieved from the data port for moving to the execution register (block 322), and each compressed data word may be inserted as the most significant bits in an uncompressed data word (block 324). For example, if a compressed data word is a first bit length, and an uncompressed data word is a second bit length that is longer than the first bit length, decompression logic consistent with some embodiments may assign the bits of the compressed data word to the most significant bits of the uncompressed data word, while assigning the remaining bits of the uncompressed data word predetermined values (i.e., all zeros, all ones, and/or some combination). The decompression logic may set an implicit bit of the uncompressed data word (block 328). For example, in a 32 bit single precision floating point number, the number includes a sign bit, exponent bits, and fraction bits, and in embodiments where the uncompressed data words are 32 bit single precision floating point numbers, the decompression logic may set an implicit bit of the sign bit, the exponent bits, and/or the fraction bits.

In addition, in some embodiments, the decompression logic may subtract 1.0 from the data words and/or data words generated in one or more steps performed by the decompression logic (block 328). As the decompression logic may perform one or more operations on the compressed data words to generate uncompressed data words, there may be intermediate data words due to the one or more operations performed on the compressed data words. For example, if a compressed data word comprises 8 bits representing an integer value, and an uncompressed data word comprises 32 bits and represents a floating point value, the decompression logic may insert the 8 bits of the compressed data word as the most significant bits of the uncompressed data word, set an implicit bit associated with the uncompressed data word, and subtract 1.0 from the intermediate data word to generate the uncompressed data word. The uncompressed data words generated by the decompression logic may be stored at an execution register of the processing block (block 330).

In some embodiments consistent with the invention, one or more compressed data words of a data packet received at a processing block may include data that is used to process red (R), green (G), Blue (B), and alpha compositing (A) data for a graphics program, generally referred to as RGBA color values. For example, a data packet may include a first compressed data word representing a red color value for a pixel, a second compressed data word representing a blue color value for the pixel, a third compressed data word representing a green color value for the pixel, and an fourth compressed data word representing an alpha channel value for the pixel. Decompression logic consistent with embodiments of the invention may convert the compressed data words into uncompressed data words including a first uncompressed data word representing a red color value for the pixel, a second uncompressed data word representing a blue color value for the pixel, a third uncompressed data word representing a green color value for the pixel, and a fourth uncompressed data word representing an alpha channel value for the pixel.

Figure 9:
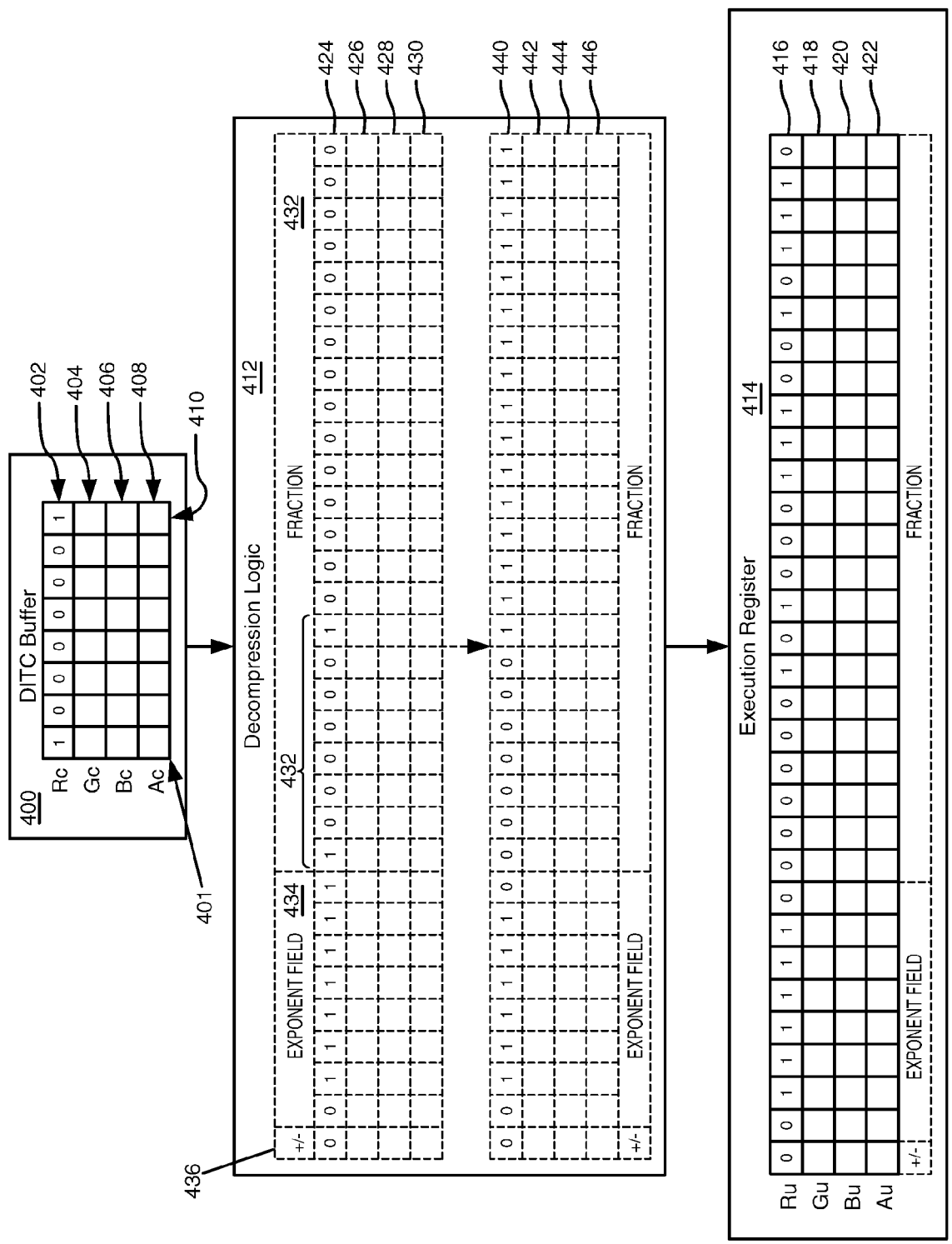
FIG. 9 is an exemplary block diagram illustrating an exemplary sequence of operations consistent with the flowcharts of FIGS. 7 and 8 that may be performed by the IP block of FIG. 6 to decompress data in parallel with moving the data from a DITC input buffer to an execution register of the IP block.

In some embodiments, each compressed data word may comprise 8 bits representative of an integer value, and the decompression logic may perform one or more operations to convert each 8 bit compressed data word to an uncompressed data word comprising 32 bits representative of a floating point value. FIG. 9 is an exemplary block diagram illustrating a sequence of operations that may be performed by a processing block consistent with embodiments of the invention to convert compressed data words representative of RGBA color values to uncompressed data words for utilization by an execution unit of the processing block in executing one or more instructions. As shown in FIG. 9, a DITC input buffer 400 of the processing block includes a data packet 401 stored thereon, where the data packet 401 includes four compressed data words 402, 404, 406, 408. Each compressed data word 402, 404, 406, 408 of the exemplary embodiment comprises 8-bits, where each bit 410 is illustrated in FIG. 8 as a box for clarity. Exemplary block diagram illustrates a first compressed data word 402 including an integer value represented in binary, where the first data word corresponds to a red value for a pixel, and is labeled 'Rc' to identify the first data word 402 as a compressed red value. The three remaining data words similarly represent color values for the pixel: a second data word 404 is labeled 'Gc' to identify the second data word as a compressed green value for the pixel, a third data word 406 is labeled 'Bc' to identify the third data word as a compressed blue value for the pixel, and a fourth data word 408 is labeled 'Ac' to identify the fourth data word as a compressed alpha channel value for the pixel. The second, third, and fourth data words include integer values represented in binary similar to the first data word; however, in this example these values have been omitted for clarity.

The DITC input buffer 400 is connected to decompression logic 412 and execution register 414, such that the compressed data words in DITC input buffer 400 may be moved to the execution register 414 through the decompression logic 412. In this exemplary block diagram, the compressed data words 402, 404, 406, 408 of the data packet 401 are moved from the DITC input buffer 400 through the decompression logic 412 to the execution register 414. In parallel with moving the compressed data words, the decompression logic 412 performs one or more operations to decompress the compressed data words 402, 404, 406, 408 to generate uncompressed data words 416, 418, 420, 422 for storing in the execution register 414.

The compressed data words 402, 404, 406, 408 are moved through decompression logic 412, where decompression logic 412 assigns each bit of each compressed data word 402, 404, 406, 408 to bits of an intermediate 32-bit floating point uncompressed data word 424, 426, 428, 430. Furthermore, the decompression logic may set one or more implicit bits of each uncompressed data word 424, 426, 428, 430, where the bits may be located in a fraction portion 432, an exponent portion 434, and/or a sign portion 436. As shown, the bits of the compressed data word 402 are assigned to the 8 most significant bits 438 of the fraction portion 432 of a first uncompressed data word 424. In addition, the decompression logic implicitly sets the remaining bits of the fraction portion 432, the sign bit 436, and the bits of the exponent portion 434 of the first uncompressed data word 424. While not illustrated, similar operations are performed for the other compressed data words 404, 406, and 408 to assign the compressed data words 404, 406, and 408 to the uncompressed data words 426, 428, 430 respectively.

In the exemplary embodiment, the decompression logic performs a floating point operation to subtract 1.0 from each intermediate uncompressed data word 424, 426, 428, 430, the results of which are illustrated as uncompressed data words 440, 442, 446, 448. The uncompressed data words 440, 442, 444, 446 generated by the decompression logic 412 are then stored in the execution register 414, where a first uncompressed data word 416 stored in the execution register represents a red color value for a pixel and is labeled as au', a second uncompressed data word 418 represents a green color value for the pixel and is labeled as 'Gu', a third uncompressed data word 420 represents a blue color value for the pixel and is labeled as 'Bu', and a fourth uncompressed data word 422 represents an alpha channel value for the pixel and is labeled as 'Au'.

Figure 10:
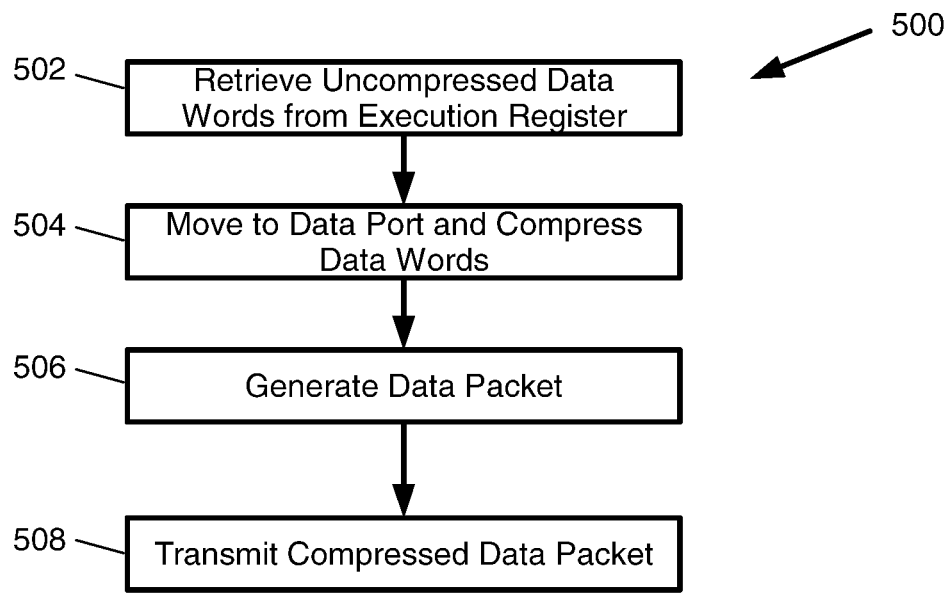
FIG. 10 is a flowchart illustrating a sequence of operations that may be performed by the IP block of FIG. 6 to compress uncompressed data in parallel with moving the uncompressed data a DITC output buffer.

FIG. 10 is a flowchart 500 illustrating a sequence of operations that may be performed by a processing block consistent with embodiments of the invention to compress data words for transmission to other processing blocks in a NOC system over an on-chip network in parallel with moving the uncompressed data words to an output buffer of the processing block connected to the on-chip network. The processing block retrieves uncompressed data words from an execution register of the processing block (block 502). The uncompressed data words are moved to the data port (i.e., a DITC output buffer) and compressed (block 504) to generate a compressed data word based on each uncompressed data word retrieved from the execution register. The compressed data words stored at the data port are packeted into a data packet (block 506), and the compressed data packet is transmitted from the data port over the on-chip network (block 508).

Figure 11:
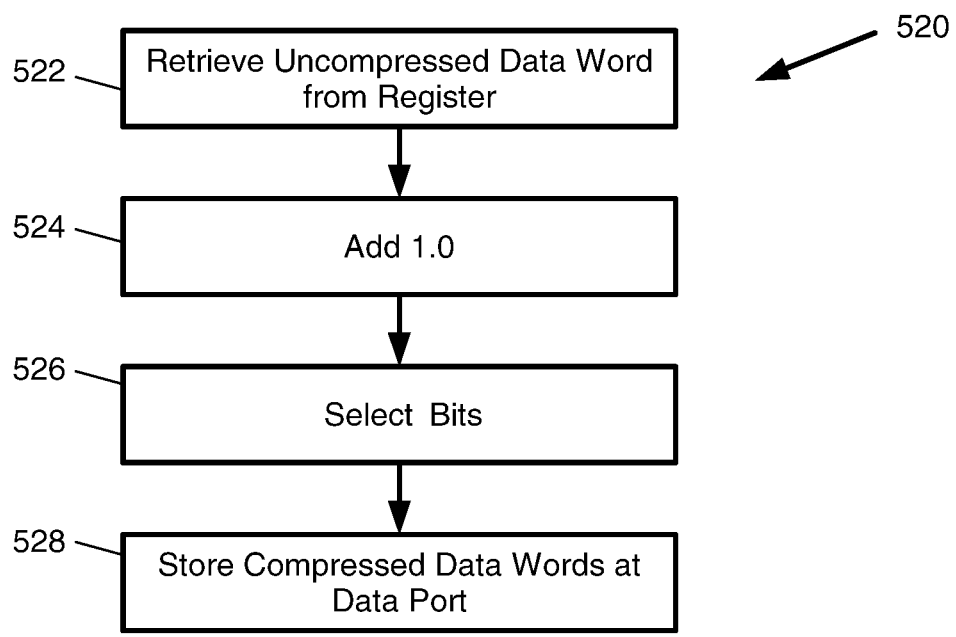
FIG. 11 is a flowchart illustrating a sequence of operations that may be performed by the IP block of FIG. 6 to compress uncompressed data in parallel with moving the uncompressed data to a DITC output buffer.

FIG. 11 is a flowchart 520 illustrating a sequence of operations that may be performed by a compression logic of a processing block consistent with embodiments of the invention to compress data words prior to transmission of the data words. Uncompressed data words are retrieved from an execution register connected to the compression logic (block 522). The compression logic adds 1.0 to the uncompressed data words (block) to normalize the uncompressed data words and generate intermediate uncompressed data words. The compression logic selects a portion of each intermediate uncompressed data word and assigns each selected portion as a compressed data word (block 526) to generate a compressed data word from each uncompressed data word. Each compressed data word is stored at a data port (i.e., a DITC output buffer) (block 528).

In some embodiments consistent with the invention, one or more uncompressed data words stored in an execution register of a processing block data that is used to process red (R), green (G), Blue (B), and alpha compositing (A) data for a graphics program, generally referred to as RGBA color values. For example, the execution register may store a first uncompressed data word representing a red color value for a pixel, a second uncompressed data word representing a blue color value for the pixel, a third uncompressed data word representing a green color value for the pixel, and a fourth uncompressed data word representing an alpha channel value for the pixel. Compression logic consistent with embodiments of the invention may convert the uncompressed data words into compressed data words in parallel with moving the uncompressed data words from the execution register to a DITC output buffer of the processing block. The compressed data words may include a first compressed data word representing a red color value for the pixel, a second compressed data word representing a blue color value for the pixel, a third compressed data word representing a green color value for the pixel, and a fourth compressed data word representing an alpha channel value for the pixel.

Furthermore, in some embodiments, uncompressed data words stored in an execution register of a processing block may comprise 32-bits representing a single precision floating point value, and a compression logic consistent with embodiments of the invention may be configured to generate a compressed data word comprising 8-bits representing an integer value based on a 32-bit uncompressed data word.

Figure 12:
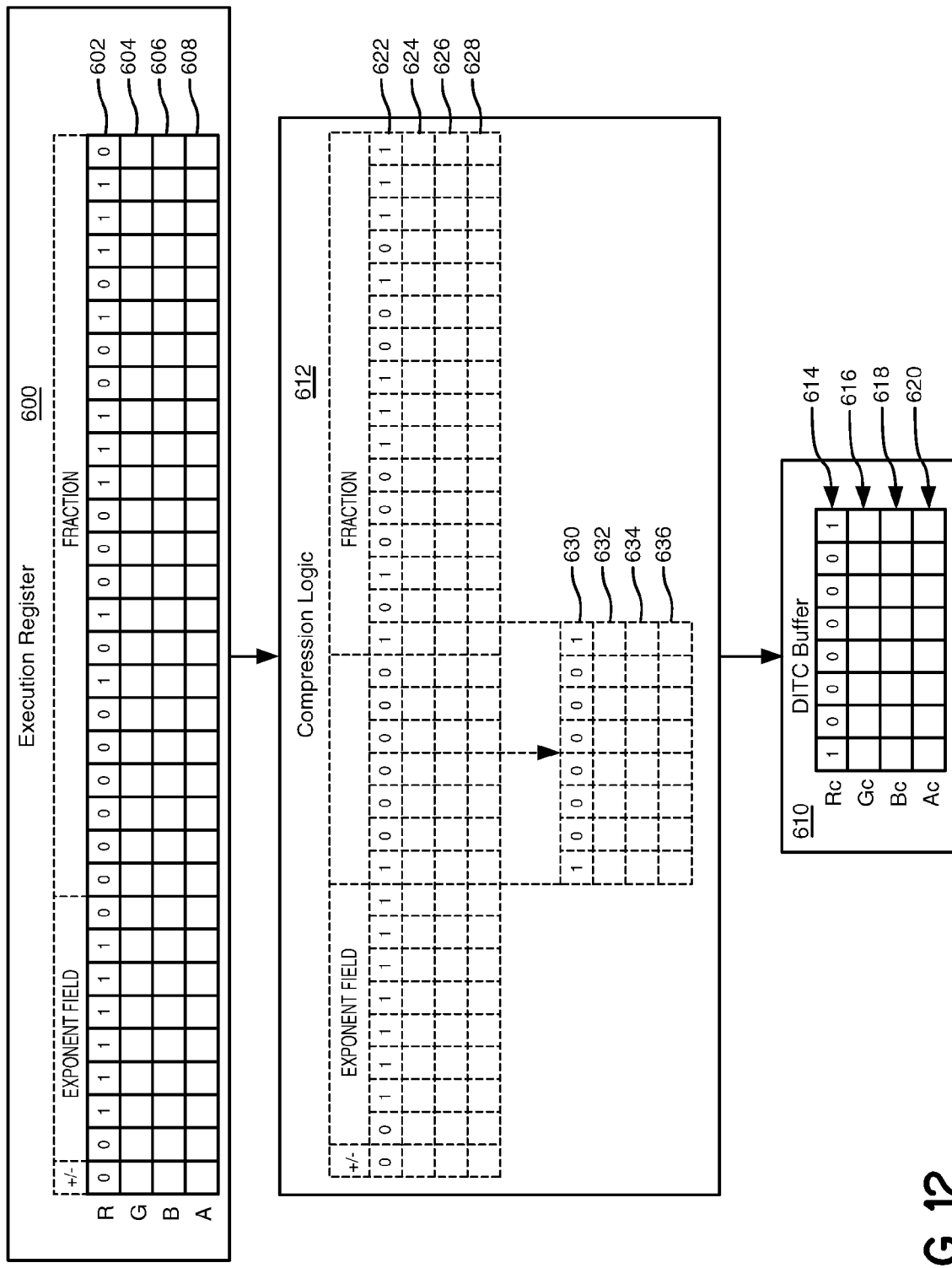
FIG. 12 is an exemplary block diagram illustrating an exemplary sequence of operations consistent with the flowcharts of FIGS. 10 and 11 that may be performed by the IP block of FIG. 6 to compress data in parallel with moving the data from an execution register to a DITC output buffer of the IP block.

FIG. 12 is an exemplary block diagram illustrating a sequence of operations that may be performed by a processing block of NOC system consistent with embodiments of the invention to convert uncompressed data words representative of RGBA color values to compressed data words for communication over an on-chip network of the NOC system. An execution register includes a first uncompressed data word 602 representative of a red color value of a pixel and labeled with an 'R' for reference purposes, a second uncompressed data word 604 representative of a green color value and labeled with a 'G', a third uncompressed data word 606 representative of a blue color value and labeled with a 'B', and a fourth uncompressed data word 608 representative of an alpha channel value and labeled with an 'A'. The uncompressed data words 602, 604, 606, 608 in the execution register 600 may be data from a processing unit of the processing block generated from one or more executed operations. Furthermore, as explained above with respect to FIG. 9, the bits of each data word (whether compressed or uncompressed) are represented in the diagram as boxes. As such, each uncompressed data word 602, 604, 606, 608 includes 32 bits, and furthermore, each uncompressed data word is representative of a 32-bit single precision floating point value. Moreover, only the values associated with each bit of the data word are provided for the first data word (i.e., the red value data word) for clarity, and the remaining data words include similar values corresponding to the green, blue, and alpha channel values.

The uncompressed data words may be moved to a DITC output buffer 612 connected to the on-chip network through the compression logic 612 such a compressed data word 614, 616, 618, 620 based on the uncompressed data words 602, 604, 606, 608 may be generated by the compression logic and stored at the DITC output buffer 610. As shown, the uncompressed data words 602, 604, 606, 608 are loaded into the compression logic 612, and the compression logic adds 1.0 to each uncompressed data word which results in intermediate uncompressed data words 622, 624, 626, 628, and the compression logic selects a portion 630, 632, 634, 636 of each intermediate uncompressed data word 622, 624, 626, 628. In the exemplary embodiment, the compression logic selects the 8 most significant bits from the fraction portion of the intermediate uncompressed data words 622, 624, 626, 628. The selected portions 630, 632, 634, 636 are stored in the DITC buffer 610 as the compressed data words 614, 616, 618, 620.

The compressed data words in the DITC output buffer 610 include a first compressed data word 614 representative of the red color value of the pixel (labeled as 'Rc' to indicate a compressed red value) based on the first uncompressed data word 602 moved from the execution register 600; a second compressed data word 616 representative of a green color value of the pixel (labeled as 'Gc' to indicate a compressed green value) based on the second uncompressed data word 604 moved from the execution register 600; a third compressed data word 618 representative of the blue color value of the pixel (labeled as 'Bc' to indicate a compressed blue value) based on the third uncompressed data word 606 moved from the execution register 600; and a fourth compressed data word representative of the alpha channel color value of the pixel (labeled as 'Ac' to indicate a compressed alpha channel value) based on the fourth uncompressed data word 608 moved from the execution register 600.

As such, in the exemplary embodiment, four uncompressed data words comprising 32 bit single precision floating point values may be compressed to generate four compressed data words comprising 8 bit integer values by compression logic consistent with embodiments of the invention. Advantageously, the compressed data words may be transmitted over the on-chip communication network more efficiently than the uncompressed data words.

Figure 13:
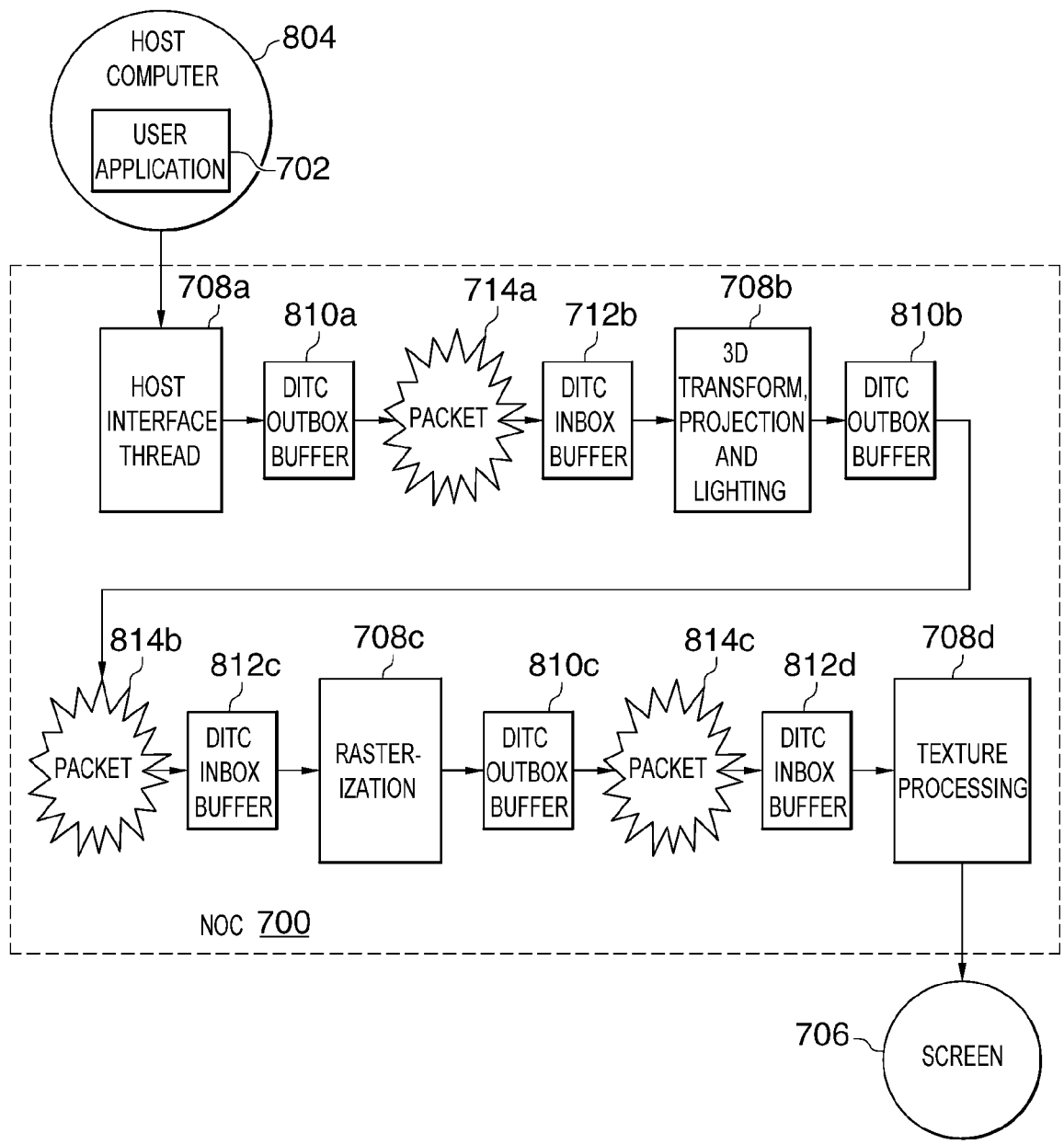
FIG. 13 is an exemplary block diagram illustrating an exemplary sequence of operations that may be performed by the NOC of FIG. 2 to process a graphics workload.

FIG. 13 provides an exemplary block diagram illustrating a NOC 700 configured to execute tasks associated with a graphics application 702 executing in the NOC 700 dispatched from a host computer 704. In some NOC systems utilizing a DITC architecture, nodes of the system may be assigned to perform different portions of a workload. In this exemplary embodiment, the processing blocks 708a, 708b, 708c, 708d are assigned to perform different portions of a graphics workload from the graphics application 702. Processing block 708a is configured to handle the state of a software pipeline associated with the NOC 700 and handle incoming graphics function calls. Processing block 708a performs one or more instructions in an execution unit of the processing block 708a, which generates output uncompressed data words representative of color values of a pixel and/or control information which are stored in an execution register associated with the processing block 708a. In parallel with moving the uncompressed data words to an associated DITC output buffer 710a, the processing block 708a utilizes a compression logic associated with the processing block 708a to generate a compressed data word corresponding to an uncompressed data word, where in some embodiments, the processing block 708a may selectively compress only desired types of uncompressed data words, while not compressing other uncompressed data words. The data stored in the DITC output buffer (i.e., the compressed data words and/or other data) is packeted into a data packet 714a and communicated over an on-chip network of the NOC 700 to a DITC input buffer 712b associated with the processing block 708b.

The data packet stored at the DITC input buffer 712b stored is moved to an execution register associated with the processing block 708b such that an execution unit of the processing block 708b may utilize the data of the data packet during execution of one or more instructions associated with the graphics workload. In parallel with moving the data packet to the execution register, a decompression logic associated with the processing block 708b decompresses compressed data words included in the data packet to generate uncompressed data words for storing in the execution register. Following the execution of one or more instructions, the execution register of the processing block 708b will include output data including uncompressed data words. Consistent with the description provided above, at least a portion of the uncompressed data words may be compressed in parallel with moving the uncompressed data words to the DITC output buffer 710b. Furthermore, similar steps may be performed at each remaining processing block 708c, 708d, such that at least a portion of uncompressed data words may be compressed prior to transmission to a subsequent processing block for further processing. The resulting data following processing by the processing block 708d may be output to a screen 706.

In the exemplary embodiment, data utilized and transmitted in the NOC system may include data words representing RGBA color values for a pixel. Advantageously, the data words representing RGBA color values for the pixel may be compressed prior to transmission over the on-chip network of the NOC and decompressed prior to utilization by execution units of processing blocks of the NOC.

In some conventional NOC systems, data words may be packed by removing null spaces between data words, and unpacked by adding the null spaces back to the appropriate places, which may be referred to as "aligning" the data words. However, in conventional systems, removing the null spaces and aligning the data words typically requires one or more instructions to be executed by an execution unit associated with a processing block. Removing the null spaces prior to transmission over an on-chip network of the NOC and re-inserting the null spaces prior to utilization in execution, requires alignment data to be included in the data packet, where the alignment data indicates where to re-insert the null spaces prior to execution. In these systems, an execution unit of a node typically executes an instruction to read the alignment data and direct logic to realign the data prior to execution. Accordingly, the re-aligning of the data generally requires execution of one or more additional instructions prior to execution. Similarly, removing the null spaces and generating the alignment data prior to transmission generally requires execution of one or more additional instructions by the execution unit of the node prior to transmission. Execution of the instructions for removing the null spaces (i.e., packing) and re-inserting the null spaces (i.e., unpacking) may lead to performance bottlenecks in NOC systems.

In some embodiments consistent with the invention, the compression and decompression logic of a processing block facilitate compression and decompression of data words in parallel with moving the data words to and from an execution register. Hence, compression and decompression logic consistent with some embodiments of the invention may not require execution of an instruction by the execution unit, which may reduce pipeline passes in the processing block. Moreover, 4 32-bit RGBA data words may be compressed to 4 8-bit data words for communication over an on-chip network of a NOC system consistent with embodiments of the invention. In addition, in some embodiments, the 4 8-bit compressed data words may be fit into one 32 bit data word for transmission. In addition, in some embodiments RGBA values may range from and include approximately 0.0 to 1.0; hence, by adding 1.0 to each floating point number, i.e., changing the range from and include approximately 1.0 to 2.0, some embodiments of the invention normalize the floating point numbers by shifting the fraction bits of the floating point number and the exponent bits.

In some embodiments, the compression logic may analyze the exponent bits of an uncompressed data word comprising a floating point number and shift the fraction bits of the floating point number accordingly for compression. In these embodiments, one or more bits of the compressed data word may be based on the exponent bits of the floating point number. In other embodiments, the compression logic may just assume that the range of the uncompressed data words corresponding to RGBA values is already in the normalized range (i.e., [1.0 to 2.0]), and the compression logic may just select bits from the fraction portion of an uncompressed data word comprising a floating point number without analyzing the exponent portion of the floating point number.

In some embodiments, decompression logic consistent with embodiments of the invention decompress a data packet including compressed data words, where the compressed data words may be approximately 8 bits each. In some embodiments a data packet may include four compressed data words, and the decompression logic may generate four uncompressed data words based on the data packet, where each uncompressed data word corresponds to one compressed data word of the data packet. Furthermore, the decompression logic may assign a compressed data word to bit positions of an uncompressed data word, including for example the most significant bits of the uncompressed data word. In addition, the decompression logic may subtract 1.0 from each compressed data word after inserting the compressed data word into bit positions of an uncompressed data word, such that the range of values of the uncompressed data word are between and include approximately 1.0 to 2.0. In other embodiments, the decompression logic may assume that the resulting values will be in the [0.0, 1.0] range without performing a subtraction operation. Furthermore, the decompression logic may set one or more bits of an uncompressed data word, including for example, one or more bits of the sign portion, one or more bits of the exponent portion, and/or one or more bits of the fraction portion prior to storing the uncompressed data word in the execution register.

Embodiments of the invention may increase performance of a NOC system by facilitating compression and decompression of data in a processing block of the NOC system in parallel with moving data between an execution register and data port buffers connected to an on-chip network of the NOC system. Performance may be improved, for example, by combining a move from data port instruction with a decompression instruction, such that an execution unit of a processing block only executes one instruction to move data from the data port to the execution register while also decompressing the data in parallel with moving the data. Similarly, performance may be improved, for example, by combining a move to data port instruction with a compression instruction, such that an execution unit of a processing block only executes one instruction to move data from the execution register to the data port while also compressing the data in parallel with moving the data.

While the invention has been illustrated by a description of the various embodiments and the examples, and while these embodiments have been described in considerable detail, it is not the intention of the applicants to restrict or in any other way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention. Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method for transferring data within a processing unit that includes a plurality of integrated processor blocks disposed on a single chip and coupled to one another in a network on a chip arrangement via an on-chip network disposed on the single chip, the on-chip network including a plurality of routers coupling the plurality of integrated processor blocks to one another via a plurality of links, the method comprising:

storing a compressed data packet from the on-chip network in an input buffer of a respective integrated processor block, wherein the compressed data packet includes a header addressed to the respective integrated processor block and a payload, wherein the payload of the compressed data packet includes a plurality of compressed data words, and wherein the input buffer comprises a data port coupled to the on-chip network; and executing an instruction to move data from the input buffer with decompression in the respective integrated processor block, wherein executing the instruction includes, in parallel with moving the payload of the compressed data packet from the input buffer to an execution register for an execution unit in the respective integrated processor block, decompressing each compressed data word of the compressed data packet utilizing decompression logic of the integrated processor block to generate an uncompressed data word from each compressed data word;

wherein the compressed data packet includes four compressed data words, a first compressed data word representing a red color value for a pixel, a second compressed data word representing a blue color value for the pixel, a third compressed data word representing a green color value for the pixel, and a fourth compressed data word representing an alpha channel value for the pixel, wherein each of the four compressed data words represents an integer value, wherein decompressing each compressed data word of the compressed data packet utilizing decompression logic of the integrated processor block to generate an uncompressed data word from each compressed data word includes converting the integer value of each of the four compressed data words to a corresponding floating point value, wherein the execution unit comprises a floating point unit, and wherein moving the payload of the compressed data packet from the input buffer to the execution register of the execution unit comprises storing the floating point values corresponding to the four compressed data words in a floating point register of the floating point unit.

2. The method of claim 1, further comprising:
executing an instruction utilizing the uncompressed data words stored in the execution register utilizing the execution unit of the integrated processor block.

3. The method of claim 1, wherein generating an uncompressed data word from a respective compressed data word includes assigning the respective compressed data word to the most significant bits of a corresponding uncompressed data word using the decompression logic.

4. The method of claim 1, wherein generating an uncompressed data word from a respective compressed data word includes subtracting 1.0 from each compressed data word using the unpack logic.

5. The method of claim 1, wherein each compressed data word has a bit length of about 8 bits and each uncompressed data word has a bit length of about 32 bits.

6. The method of claim 1, wherein generating an uncompressed data word from a respective compressed data word includes setting an implicit bit associated with the compressed data packet as the most significant bit of the uncompressed data word using the decompression logic.

7. The method of claim 1, wherein each of the plurality of uncompressed data words represents a single-precision floating point value.

8. The method of claim 7, wherein each of the plurality of compressed data words represents an 8-bit integer value, and wherein decompressing each compressed data word of the compressed data packet utilizing decompression logic of the integrated processor block to generate an uncompressed data word from each compressed data word includes converting the 8-bit integer value of each compressed data word to a single-precision floating point value.

9. A method for transferring data within a processing unit of the type that includes a plurality of integrated processor blocks disposed on a single chip and coupled to one another in a network on a chip arrangement via an on-chip network disposed on the single chip, the on-chip network including a plurality of routers coupling the plurality of integrated processor blocks to one another via a plurality of links, the method comprising:

executing an instruction to move data to an output buffer with compression in a respective integrated processor block, wherein executing the instruction includes, in parallel with moving uncompressed data words stored in an execution register for an execution unit in the respective integrated processor block to the output buffer of the respective integrated processor block for communication over the on-chip network, compressing each uncompressed data word utilizing compression logic of the respective integrated processor block to generate a compressed data word from each uncompressed data word, wherein the output buffer comprises a data port coupled to the on-chip network; and generating a compressed data packet including the compressed data words, wherein the compressed data packet includes a header addressed to another integrated processor block and a payload including the compressed data words;

wherein the compressed data packet includes four compressed data words, a first compressed data word representing a red color value for a pixel, a second compressed data word representing a blue color value for the pixel, a third compressed data word representing a green color value for the pixel, and a fourth compressed data word representing an alpha channel value for the pixel, wherein the plurality of uncompressed data words includes four uncompressed data words, wherein each of the four uncompressed data words represents a floating point value, wherein compressing each uncompressed data word utilizing compression logic of the integrated processor block to generate a compressed data word from each uncompressed data word includes converting the floating point value of each of the four uncompressed data words to a corresponding integer value, wherein the execution unit comprises a floating point unit and the execution register comprises a floating point register for the floating point unit, and wherein generating the compressed data packet includes generating the payload of the compressed data packet from the corresponding integer values for the four uncompressed data words.

10. The method of claim 9, wherein compressing each uncompressed data word utilizing compression logic of the integrated processor block to generate a compressed data word from each uncompressed data word includes selecting a portion from each uncompressed data word using the compression logic, and each compressed data word includes a respective selected portion from an uncompressed data word.

11. The method of claim 9, wherein generating the compressed data packet including the compressed data words includes combining the compressed data words into a compressed data packet.

12. The method of claim 11, further comprising transmitting the compressed data packet from the respective integrated processor block to another integrated processor block.

13. The method of claim 8, wherein compressing each uncompressed data word utilizing compression logic of the respective integrated processor block to generate a compressed data word from each uncompressed data word includes adding 1.0 to the uncompressed data word.

14. The method of claim 8, wherein each of the plurality of uncompressed data words represents a single-precision floating point value.

15. The method of claim 14, wherein each of the plurality of compressed data words represents an 8-bit integer value, and wherein compressing each uncompressed data word utilizing compression logic of the respective integrated processor block to generate a compressed data word from each uncompressed data word includes converting the single-precision floating point value of each uncompressed data word to an 8-bit integer value.

16. A circuit arrangement, comprising:
an execution register configured to store output uncompressed data words, wherein the execution register is for an execution unit and is disposed within an integrated processor block among a plurality of integrated processor blocks disposed on a single chip and coupled to one another in a network on a chip arrangement via an on-chip network disposed on the single chip, the on-chip network including a plurality of routers coupling the plurality of integrated processor blocks to one another via a plurality of links;
an output buffer coupled to the execution register and configured to store a plurality of output compressed data words for use in generating a compressed data packet including a header addressed to another integrated processor block and a payload including the plurality of output compressed data words, wherein the output buffer comprises a data port coupled to the on-chip network; and
compression logic coupled to the execution register and the output buffer and configured to, in response to execution of an instruction to move data to the output buffer with compression by the integrated processor block, receive a respective output uncompressed data word from the execution register and compress the respective output uncompressed data word to generate a respective output compressed data word based on the respective output uncompressed data word and transmit the respective output compressed data word to the output buffer for communication over the on-chip network, such that the respective output uncompressed data word is compressed to generate the respective output compressed data word in parallel with the respective output uncompressed data being moved from the execution register to the output buffer;
wherein the compressed data packet includes four compressed data words, a first compressed data word representing a red color value for a pixel, a second compressed data word representing a blue color value for the pixel, a third compressed data word representing a green color value for the pixel, and a fourth compressed data word representing an alpha channel value for the pixel, wherein the plurality of uncompressed data words includes four uncompressed data words, wherein each of the four uncompressed data words represents a floating point value, wherein the compression logic is configured to compress each uncompressed data word to generate a compressed data word from each uncompressed data word by converting the floating point value of each of the four uncompressed data words to a corresponding integer value, and wherein the execution unit comprises a floating point unit and the execution register comprises a floating point register for the floating point unit.

17. The circuit arrangement of claim 16, wherein the execution register is further configured to store input uncompressed data words, the circuit arrangement further comprising:
an input buffer coupled to the execution register and configured to store a data packet including a plurality of input compressed data words; and
decompression logic coupled to the input buffer and the execution register and configured to receive a respective input compressed data word from the input buffer and decompress the respective input compressed data word to generate a respective input uncompressed data word based on the input compressed data word and transmit the respective input compressed data word to the execution register, such that the respective input compressed data word is decompressed to generate the respective input uncompressed data word in parallel with the respective input compressed data word being moved from the input buffer to the execution register.

18. The circuit arrangement of claim 17, wherein the uncompressed data words represent single-precision floating point values and the compressed data words represent 8-bit integer values,
wherein the compression logic is configured to compress the respective output uncompressed data word to generate the respective output compressed data word by converting the single-precision floating point value represented by the respective output uncompressed data word to the 8-bit integer value represented by the respective output compressed data word, and
wherein the decompression logic is configured to decompress the respective input compressed data word to generate the respective input uncompressed data word by converting the 8-bit integer value represented by the respective input compressed data word to the single-precision floating point value represented by the input uncompressed data word.

19. A program product comprising a non-transitory computer readable medium and logic definition program code resident on the computer readable medium and defining the circuit arrangement of claim 16.

20. The circuit arrangement of claim 16, wherein the compression logic is configured to compress the respective output uncompressed data word to generate the respective output compressed data word by selecting a portion from the respective output uncompressed data word.

21. A circuit arrangement, comprising:
an execution register configured to store uncompressed data words, wherein the execution register is for an execution unit and is disposed within an integrated processor block among a plurality of integrated processor blocks disposed on a single chip and coupled to one another in a network on a chip arrangement via an on-chip network disposed on the single chip, the on-chip network including a plurality of routers coupling the plurality of integrated processor blocks to one another via a plurality of links;
an input buffer coupled to the execution register and configured to store a payload of a data packet from the on-chip network, the payload of the data packet including a plurality of input compressed data words, the data packet further including a header addressed to the integrated circuit block within which the execution register is disposed, wherein the input buffer comprises a data port coupled to the on-chip network; and decompression logic coupled to the execution register and the input buffer and configured to, in response to execution of an instruction to move data from the input buffer with decompression by the integrated processor block, receive a respective input compressed data word from the input buffer and decompress the respective input compressed data word to generate a respective input uncompressed data word based on the input compressed data word and transmit the respective input compressed data word to the execution register, such that the respective input compressed data word is decompressed to generate the respective input uncompressed data word in parallel with the respective input compressed data word being moved from the input buffer to the execution register;

wherein the data packet includes four compressed data words, a first compressed data word representing a red color value for a pixel, a second compressed data word representing a blue color value for the pixel, a third compressed data word representing a green color value for the pixel, and a fourth compressed data word representing an alpha channel value for the pixel, wherein each of the four compressed data words represents an integer value, wherein the decompression logic is configured to decompress each compressed data word of the compressed data packet to generate an uncompressed data word from each compressed data word by converting the integer value of each of the four compressed data words to a corresponding floating point value, and wherein the execution unit comprises a floating point unit including a floating point register configured to store corresponding floating point values for the integer values of the four compressed data words.

22. A program product comprising a non-transitory computer readable medium and logic definition program code resident on the computer readable medium and defining the circuit arrangement of claim 21.

23. The circuit arrangement of claim 21, wherein the decompression logic is configured to decompress the respective input compressed data word to generate the respective input uncompressed data word by assigning the respective input compressed data word to the most significant bits of the respective input uncompressed data word.

* * * * *